(12) United States Patent
Zhou et al.

(10) Patent No.: US 11,644,713 B2
(45) Date of Patent: May 9, 2023

(54) DISPLAY PANEL, DISPLAY MODULE, AND METHOD FOR DRIVING DISPLAY PANEL

(71) Applicant: BOE TECHNOLOGY GROUP CO., LTD., Beijing (CN)

(72) Inventors: Lijia Zhou, Beijing (CN); Li Tian, Beijing (CN); Jingquan Wang, Beijing (CN); Hongli Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 399 days.

(21) Appl. No.: 16/769,817

(22) PCT Filed: Dec. 24, 2019

(86) PCT No.: PCT/CN2019/127768
§ 371 (c)(1),
(2) Date: Jun. 4, 2020

(87) PCT Pub. No.: WO2020/140791
PCT Pub. Date: Jul. 9, 2020

(65) Prior Publication Data
US 2021/0223619 A1   Jul. 22, 2021

(30) Foreign Application Priority Data
Jan. 4, 2019 (CN) .......................... 201910008409.0

(51) Int. Cl.
*G02F 1/1335* (2006.01)
*G02F 1/1333* (2006.01)
(Continued)

(52) U.S. Cl.
CPC .... *G02F 1/133526* (2013.01); *G02F 1/13338* (2013.01); *G06F 1/1605* (2013.01);
(Continued)

(58) Field of Classification Search
None
See application file for complete search history.

(56) References Cited

U.S. PATENT DOCUMENTS

2017/0090637 A1* 3/2017 Yoon ................. G06F 3/0447
2017/0263648 A1* 9/2017 Li ...................... H01L 27/1214
(Continued)

FOREIGN PATENT DOCUMENTS

CN    102914921 A    2/2013
CN    205844670 U    12/2016
(Continued)

OTHER PUBLICATIONS

Machine translation of CN 205844670 U, 2016.*

*Primary Examiner* — Lucy P Chien
(74) *Attorney, Agent, or Firm* — The Webb Law Firm (57) ABSTRACT

The present application provides a display panel, a display module, and a method for driving the display panel, for simplifying a display screen structure and reducing the overall thickness. The display panel comprises: a liquid crystal display panel and a liquid crystal lens; wherein the liquid crystal display panel comprises: a first substrate and a second substrate located to face each other, and a first liquid crystal layer located between the first substrate and the second substrate; wherein the liquid crystal lens comprises: a third substrate located on one side of the first substrate away from the second substrate, and a second liquid crystal layer located between the first substrate and the third substrate; wherein the third substrate is located within a display region.

20 Claims, 6 Drawing Sheets

(51) Int. Cl.
*G06F 1/16* (2006.01)
*G02F 1/13357* (2006.01)
*G09G 3/36* (2006.01)

(52) U.S. Cl.
CPC .. *G02F 1/133514* (2013.01); *G02F 1/133528* (2013.01); *G02F 1/133603* (2013.01); *G09G 3/3696* (2013.01)

(56) References Cited

U.S. PATENT DOCUMENTS

| | | | |
|---|---|---|---|
| 2018/0052348 A1* | 2/2018 | Park | G02F 1/13336 |
| 2019/0035773 A1* | 1/2019 | Lo | H01L 27/1248 |
| 2019/0096338 A1* | 3/2019 | Furukawa | G09G 3/3674 |
| 2019/0331959 A1* | 10/2019 | Weindorf | G02F 1/13725 |

FOREIGN PATENT DOCUMENTS

| | | | | |
|---|---|---|---|---|
| CN | 108761885 A | | 11/2018 | |
| CN | 109001935 A | | 12/2018 | |
| CN | 109116636 A | | 1/2019 | |
| CN | 109541863 A | | 3/2019 | |
| EP | 2720084 A1 | | 4/2014 | |
| JP | 2017219700 A | | 12/2017 | |
| JP | 2018018043 A | * | 2/2018 | ....... G02F 1/133504 |

* cited by examiner

DISPLAY PANEL, DISPLAY MODULE, AND METHOD FOR DRIVING DISPLAY PANEL

CROSS-REFERENCE TO RELATED APPLICATIONS

This application is the United States national phase of International Application No. PCT/CN2019/127768 filed Dec. 24, 2019, and claims the priority to the Chinese Patent Application No. 201910008409.0 filed Jan. 4, 2019, the disclosures of which are hereby incorporated by reference in their entirety.

TECHNICAL FIELD

The present application relates to the technical field of display, and particularly to a display panel, a display module, and a method for driving the display panel.

BACKGROUND

At present, one of the difficulties in full-screen design resides in hiding of a front camera. Since the camera is difficult to be organically compatible with a display screen, a camera region is usually required to be additionally provided in an area outside the screen, so that a real "full-screen" cannot be realized, and the current full-screen design is thick in overall thickness.

SUMMARY

In view of this, an objective of the present disclosure is to provide a display panel, a display module, and a method for driving the display panel, so as to simplify a display screen structure and reduce an overall thickness.

In order to achieve the above objective, the present application provides the following technical solutions:

In a first aspect, a display panel is provided, comprising: a liquid crystal display panel and a liquid crystal lens;

wherein the liquid crystal display panel comprises: a first substrate and a second substrate disposed to face each other, and a first liquid crystal layer located between the first substrate and the second substrate;

wherein the liquid crystal lens comprises: a third substrate disposed on one side of the first substrate away from the second substrate, and a second liquid crystal layer located between the first substrate and the third substrate;

wherein the third substrate is located within a display region.

In some embodiments, a thickness of the second liquid crystal layer is greater than a thickness of the first liquid crystal layer.

In some embodiments, the liquid crystal display panel further comprises: a first polarizer located on one side of the second substrate away from the first substrate, a second polarizer located on one side of the first substrate away from the second substrate, a color film layer located on one side of the first substrate close to the first liquid crystal layer, a common electrode located on one side of the second substrate close to the first liquid crystal layer, and a pixel electrode located on one side of the color film layer close to the first liquid crystal layer;

an orthographic projection area of the first polarizer on the second substrate is overlapped with an area of the second substrate;

an orthographic projection area of the second polarizer on the first substrate is a first area, an orthographic projection area of the third substrate on the first substrate is a second area, the first area and the second area are not overlapped, and an area formed by the first area and the second area is overlapped with an area of the first substrate;

an orthographic projection area of the color film layer on the first substrate is overlapped with the orthographic projection area of the second polarizer on the first substrate;

each of an orthogonal projection area of the common electrode on the second substrate and an orthogonal projection area of the pixel electrode on the second substrate is overlapped with the area of the second substrate; and the liquid crystal lens is located on a light-emitting surface side of the liquid crystal display panel, and the liquid crystal lens further comprises a lens electrode located on one side of the third substrate close to the second liquid crystal layer.

In some embodiments, the liquid crystal display panel further comprises: a first polarizer located on one side of the second substrate away from the first substrate, a second polarizer located on one side of the first substrate away from the second substrate, a color film layer located on one side of the second substrate close to the first liquid crystal layer, a common electrode located on one side of the color film layer close to the first liquid crystal layer, and a pixel electrode located on one side of the first substrate close to the first liquid crystal layer;

an orthographic projection area of the first polarizer on the second substrate is overlapped with an area of the second substrate;

an orthographic projection area of the second polarizer on the first substrate is a first area, an orthographic projection area of the third substrate on the first substrate is a second area, the first area and the second area are not overlapped, and an area formed by the first area and the second area is overlapped with an area of the first substrate;

an orthographic projection area of the color film layer on the first substrate is overlapped with the orthographic projection area of the second polarizer on the first substrate;

each of an orthogonal projection area of the common electrode on the second substrate and an orthogonal projection area of the pixel electrode on the second substrate is overlapped with the area of the second substrate; and the liquid crystal lens is located on one side of the liquid crystal display panel away from a light-emitting surface, and the liquid crystal lens further comprises a lens electrode located on one side of the third substrate close to the second liquid crystal layer.

In some embodiments, the liquid crystal display panel further comprises: a quantum rod color film located on one side of the second substrate away from the first substrate, a first polarizer located on one side of the first substrate away from the second substrate, a common electrode located on one side of the second substrate close to the first liquid crystal layer, and a pixel electrode located on one side of the first substrate close to the first liquid crystal layer;

an orthographic projection area of the quantum rod color film on the second substrate is overlapped with an area of the second substrate;

an orthographic projection area of the first polarizer on the first substrate is a first area, an orthographic projection area of the third substrate on the first substrate is a second area, the first area and the second area are not overlapped, and an area formed by the first area and the second area is overlapped with an area of the first substrate;

each of an orthogonal projection area of the common electrode on the second substrate and an orthogonal projection area of the pixel electrode on the second substrate is overlapped with the area of the second substrate;

the liquid crystal lens is located on a light-emitting surface side of the liquid crystal display panel, and the liquid crystal lens further comprises: a lens electrode located on one side of the third substrate close to the second liquid crystal layer, and a second polarizer located on one side of the third substrate away from the second liquid crystal layer; and an orthographic projection area of the second polarizer on the third substrate is overlapped with an area of the third substrate.

In some embodiments, a pattern of the lens electrode is the same as a pattern of the pixel electrode.

In some embodiments, the pixel electrode comprises a plurality of sets of sub-pixel electrodes, and orthographic projection areas of the plurality of sets of sub-pixel electrodes on the second substrate are overlapped with an orthographic projection area of the third substrate on the second substrate; and each set of sub-pixel electrodes are located on a circle which takes a center of the liquid crystal lens as a center of the circle, and each circle has a different radius.

In some embodiments, the liquid crystal display panel further comprises an optical element disposed around the first liquid crystal layer; and the liquid crystal lens further comprises a sealing glue, located between the first substrate and the third substrate, for sealing the second liquid crystal layer.

In a second aspect, a display module is provided comprising: an imaging module, and the display panel provided in the first aspect;

wherein the imaging module is located on one side of the liquid crystal display panel away from a light-emitting surface, and an orthographic projection area of the imaging module on the first substrate is overlapped with an orthographic projection area of the third substrate on the first substrate.

In some embodiments, the display module further comprises a backlight source located on said one side of the liquid crystal display panel away from the light-emitting surface;

wherein, no backlight source is located at a position of the imaging module.

In some embodiments, the backlight source comprises a number of white micro-LEDs arranged in an array.

In some embodiments, the display module further comprises a light homogenizing plate located between the backlight source and the liquid crystal display panel and provided with an opening at the position of the imaging module.

In some embodiments, an edge of the opening is wedge-shaped.

In a third aspect, a method for driving the display panel provided in the first aspect is provided, comprising:

in a display mode, applying a first voltage to the first liquid crystal layer, wherein the first voltage is used for providing a voltage for a display picture;

in a camera mode, applying a second voltage to the second liquid crystal layer and the first liquid crystal layer at a first position so that the second liquid crystal layer and the first liquid crystal layer at the first position are in a lens state; wherein, an orthographic projection area of the first liquid crystal layer at the first position on the first substrate is overlapped with an orthographic projection area of the third substrate on the first substrate.

In some embodiments, the driving method further comprises:

in a display mode, applying a same first voltage to the lens electrode and the pixel electrode, wherein the first voltage is used for providing a voltage for a display picture;

in a camera mode, applying a third voltage to the pixel electrode at a second position, applying the first voltage to the pixel electrode at other positions, applying a fourth voltage to the lens electrode, wherein the third voltage and the fourth voltage are used for adjusting a focal length of the liquid crystal lens;

wherein, an orthographic projection area of the pixel electrode at the second position on the first substrate is overlapped with an orthographic projection area of the third substrate on the first substrate.

As compared with the related art, the solution of the present application has the following beneficial effects:

In the embodiments of the present application, a liquid crystal lens is provided within the display region and comprises a third substrate disposed to face the first substrate and a second liquid crystal layer located between the first substrate and the third substrate, wherein the liquid crystal lens can serve as an imaging lens of the imaging module during imaging, that is, the liquid crystal lens provided in the embodiments of the present application can replace the imaging lens in the front camera in the related part, and thus can simplify the camera module structure; moreover, in the embodiments of the present application, in addition to that the second liquid crystal layer serves as a part of the liquid crystal lens, the first liquid crystal layer at a position corresponding to the second liquid crystal layer can also serve as a part of the liquid crystal lens, thereby reducing the overall thickness.

Additional aspects and advantages of the present application will be set forth in part in the description below, and these will be apparent from the description below, or may be learned by practice of the present application.

BRIEF DESCRIPTION OF THE DRAWINGS

The above and/or additional aspects and advantages of the present application will become apparent and readily appreciated from the following description of the embodiments, taken in conjunction with the accompanying drawings, in which.

DETAILED DESCRIPTION

Reference will now be made in detail to the embodiments of the present application, examples of which are illustrated in the accompanying drawings, wherein same or similar reference numerals refer to the same or similar elements or elements having the same or similar functions throughout. The embodiments described below with reference to the accompanying drawings are exemplary only for explaining the present application and are not construed as limiting the present application.

Those skilled in the art would appreciate that, singular forms "a", "an", "said" and "the" as used herein are intended to include plural forms as well, unless the context clearly indicates otherwise. It will be further understood that, the term "comprise" used in this specification specifies the presence of stated features, integers, steps, operations, elements, and/or components, but do not preclude the presence or addition of one or more other features, integers, steps, operations, elements, components, and/or combinations thereof. It should be understood that when an element is referred to as being "connected" to another element, it can be directly connected to the other element or intervening elements may also be present. Further, "connected" as used herein may include wirelessly connected. As used herein, the term "and/or" includes all or any of one or more associated listed items and all combinations thereof.

Those skilled in the art would appreciate that, all terms (including technical or scientific terms) as used herein have the same meanings as understood by one of ordinary skill in the art, unless otherwise specifically defined. It should also be understood that the terms defined in common dictionaries should be interpreted as having meanings consistent with their meanings in the context of the relevant art, but should not be interpreted with idealized or extremely formalized meanings, unless otherwise expressly defined herein.

"One region overlapped with the other region" mentioned in this application means that an area of the overlapped portion of the two regions accounts for 90% or more of an area of the one region or the other region.

The technical solution of an embodiment of the present application is described in the following with reference to the accompanying drawings.

Figure 1:
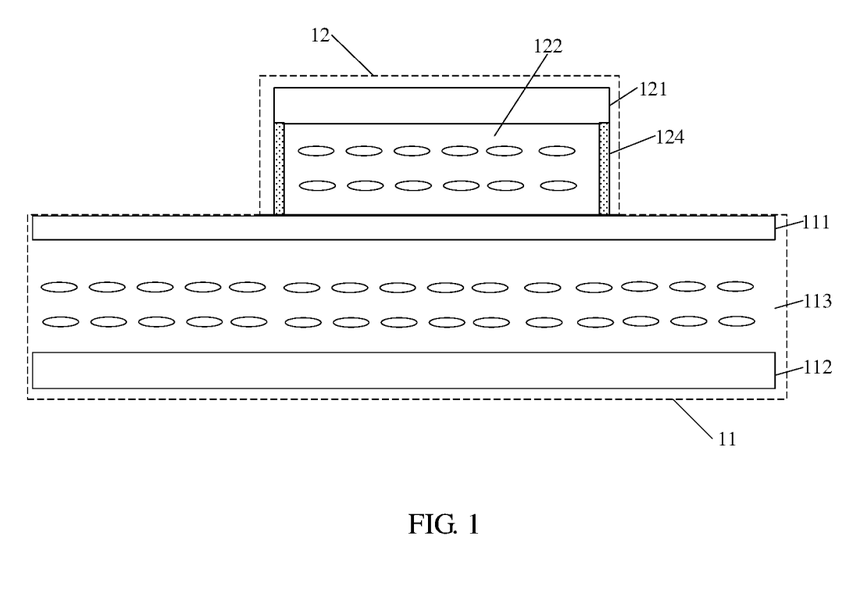
FIG. 1 is a cross-sectional structural schematic diagram of a display panel provided in the present application.

As shown in FIG. 1, it is a cross-sectional structural schematic diagram of a display panel provided in an embodiment of the present application, the display panel comprising: a liquid crystal display panel 11 and a liquid crystal lens 12; wherein the liquid crystal display panel 11 comprises: a first substrate 111 and a second substrate 112 disposed to face each other, and a first liquid crystal layer 113 located between the first substrate 111 and the second substrate 112; wherein the liquid crystal lens 12 comprises: a third substrate 121 disposed on one side of the first substrate 111 away from the second substrate 112, and a second liquid crystal layer 122 located between the first substrate 111 and the third substrate 121; wherein the third substrate 121 is located within a display region.

In the embodiment of the present application, a liquid crystal lens is provided in the display region and comprises a third substrate disposed to face the first substrate and a second liquid crystal layer located between the first substrate and the third substrate, wherein the liquid crystal lens can serve as an imaging lens of the imaging module during imaging, that is, the liquid crystal lens provided in the embodiment of the present application can replace the imaging lens in the front camera in the related part, and thus can simplify the camera module structure; moreover, in the embodiment of the present application, in addition to that the second liquid crystal layer serves as a part of the liquid crystal lens, the first liquid crystal layer at a position corresponding to the second liquid crystal layer can also serve as a part of the liquid crystal lens, thereby reducing the overall thickness.

Specifically, in the embodiment of the present application, a thickness of the second liquid crystal layer 122 is greater than that of the first liquid crystal layer 113, for example, the thickness of the second liquid crystal layer 122 is several times to several tens of times greater than that of the first liquid crystal layer 113, and in this way, the second liquid crystal layer 122 can substantially maintain a transparent state during display on the display screen.

Specifically, an area of the first substrate is substantially the same as an area of the second substrate, and the area of the first substrate is larger than an area of the third substrate. More specifically, the area of the first substrate is several times, several tens of times, or several hundreds of times larger than the area of the third substrate. An area ratio of the third substrate to the first substrate may be set according to an area ratio of the camera to the display screen.

Figure 3:
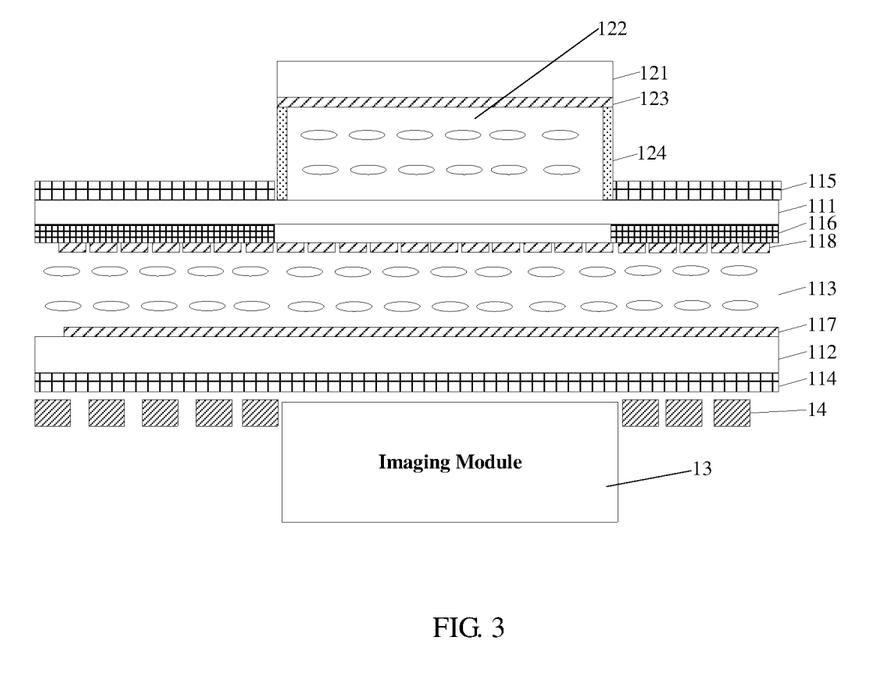
FIG. 3 is a cross-sectional structural schematic diagram of a display module of FIG. 2 taken along direction AA1.

In some embodiments, as shown in FIG. 3, the liquid crystal display panel according to an embodiment of the present application further comprises: a first polarizer 114 located on one side of the second substrate 112 away from the first substrate 111, a second polarizer 115 located on one side of the first substrate 111 away from the second substrate 112, a color film layer 116 located on one side of the first substrate 111 close to the first liquid crystal layer 113, a common electrode 117 located on one side of the second substrate 112 close to the first liquid crystal layer 113, and a pixel electrode 118 located on one side of the color film layer 116 close to the first liquid crystal layer 113.

As shown in FIG. 3, an orthographic projection area of the first polarizer 114 on the second substrate 112 is overlapped with an area of the second substrate 112; an orthographic projection area of the second polarizer 115 on the first substrate 111 is a first area, an orthographic projection area of the third substrate 121 on the first substrate 111 is a second area, the first area and the second area are not overlapped, and an area formed by the first area and the second area is overlapped with an area of the first substrate 111; an orthographic projection area of the color film layer 116 on the first substrate 111 is overlapped with an orthographic projection area of the second polarizer 115 on the first substrate 111; each of an orthogonal projection area of the common electrode 117 on the second substrate 112 and an orthogonal projection area of the pixel electrode 118 on the second substrate 112 is overlapped with the area of the second substrate 112; and the liquid crystal lens 12 is located on a light emitting surface side of the liquid crystal display panel 11, and the liquid crystal lens 12 further comprises a lens electrode 123 located on one side of the third substrate 121 close to the second liquid crystal layer 122.

Figure 4:
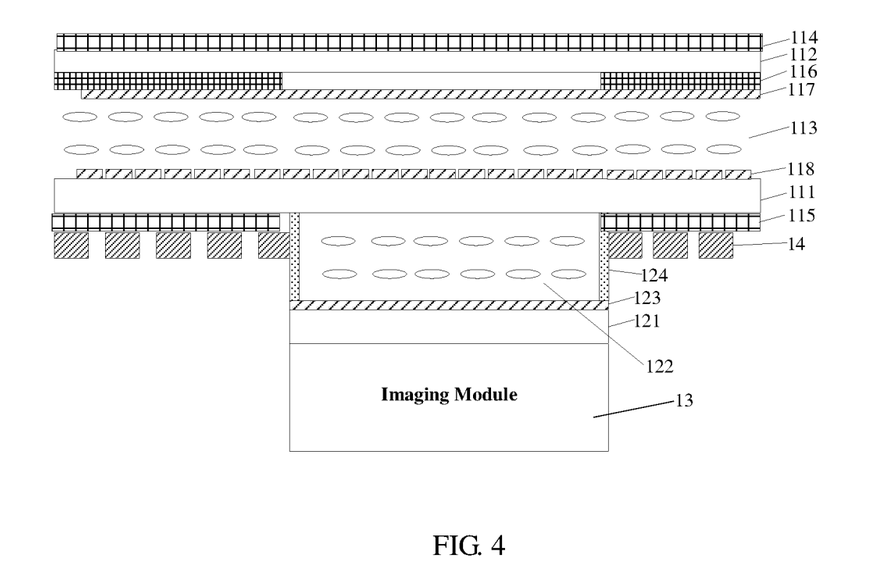
FIG. 4 is a cross-sectional structural schematic diagram of another display module of FIG. 2 taken along direction AA1.

In some other embodiments, as shown in FIG. 4, the liquid crystal display panel according to an embodiment of the present application further comprises: a first polarizer 114 located on one side of the second substrate 112 away from the first substrate 111, a second polarizer 115 located on one side of the first substrate 111 away from the second substrate 112, a color film layer 116 located on one side of the second substrate 112 close to the first liquid crystal layer 113, a common electrode 117 located on one side of the color film layer 116 close to the first liquid crystal layer 113, and a pixel electrode 118 located on one side of the first substrate 111 close to the first liquid crystal layer 113.

As shown in FIG. 4, an orthographic projection area of the first polarizer 114 on the second substrate 112 is overlapped with the area of the second substrate 112; an orthographic projection area of the second polarizer 115 on the first substrate 111 is a first area, an orthographic projection area of the third substrate 121 on the first substrate 111 is a second area, the first area and the second area are not overlapped, and an area formed by the first area and the second area is overlapped with the area of the first substrate 111; an orthographic projection area of the color film layer 116 on the first substrate 111 is overlapped with the orthographic projection area of the second polarizer 115 on the first substrate 111; each of an orthogonal projection area of the common electrode 117 on the second substrate 112 and an orthogonal projection area of the pixel electrode 118 on the second substrate 112 is overlapped with the area of the second substrate 112; and the liquid crystal lens 12 is located on one side of the liquid crystal display panel 11 away from the light emitting surface, and the liquid crystal lens 12 further comprises a lens electrode 123 located on one side of the third substrate 121 close to the second liquid crystal layer 122.

Figure 5:
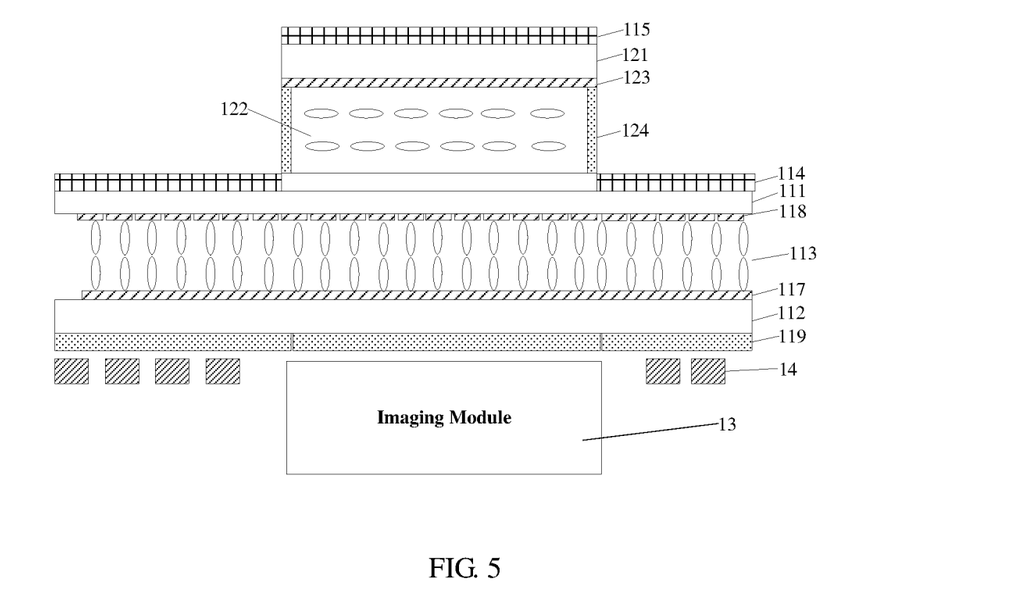
FIG. 5 is a cross-sectional structural schematic diagram of still another display module of FIG. 2 taken along direction AA1.

In still other embodiments, as shown in FIG. 5, the liquid crystal display panel according to an embodiment of the present application further comprises: a quantum rod color film 119 located on the side of the second substrate 112 away from the first substrate 111, a first polarizer 114 located on one side of the first substrate 111 away from the second substrate 112, a common electrode 117 located on the side of the second substrate 112 close to the first liquid crystal layer 113, and a pixel electrode 118 located on the side of the first substrate 111 close to the first liquid crystal layer 113.

As shown in FIG. 5, an orthographic projection area of the quantum rod color film 119 on the second substrate 112 is overlapped with the area of the second substrate 112; an orthographic projection area of the first polarizer 114 on the first substrate 111 is a first area, an orthographic projection area of the third substrate 121 on the first substrate 111 is a second area, the first area and the second area are not overlapped, and an area formed by the first area and the second area is overlapped with the area of the first substrate 111; each of an orthogonal projection area of the common electrode 117 on the second substrate 112 and an orthogonal projection area of the pixel electrode 118 on the second substrate 112 is overlapped with the area of the second substrate 112; the liquid crystal lens 12 is located on a light emitting surface side of the liquid crystal display panel 11, and the liquid crystal lens 12 further comprises: a lens electrode 123 on one side of the third substrate 121 close to the second liquid crystal layer 122, and a second polarizer 115 on one side of the third substrate 121 away from the second liquid crystal layer 122; and an orthographic projection area of the second polarizer 115 on the third substrate 121 is overlapped with the area of the third substrate 121.

Furthermore, the liquid crystal display panel provided in the embodiment of the present application further comprises an optical element disposed around the first liquid crystal layer, for example, the optical element may be a convex lens, and the optical element is arranged to enlarge the peripheral pixels of the first liquid crystal layer that can normally display, so as to reduce adverse effects caused by the abnormal display of a part of the first liquid crystal layer as much as possible.

In some embodiments, as shown in FIG. 3 to FIG. 5, the liquid crystal lens 12 further comprises a sealing glue 124, located between the first substrate 111 and the third substrate 121, for sealing the second liquid crystal layer 122, wherein the material of the sealing glue 124 is selected similarly as the related art.

In some embodiments, as shown in FIG. 3 to FIG. 5, a pattern of the lens electrode 123 is the same as that of the pixel electrode 118, and in the display mode, the same voltage is applied to the pixel electrode 118 and lens electrode 123 which correspond to each other to avoid the influence of the pixel voltage on the second liquid crystal layer 122, to make ensure that it maintains a good transparent state.

Figure 7:
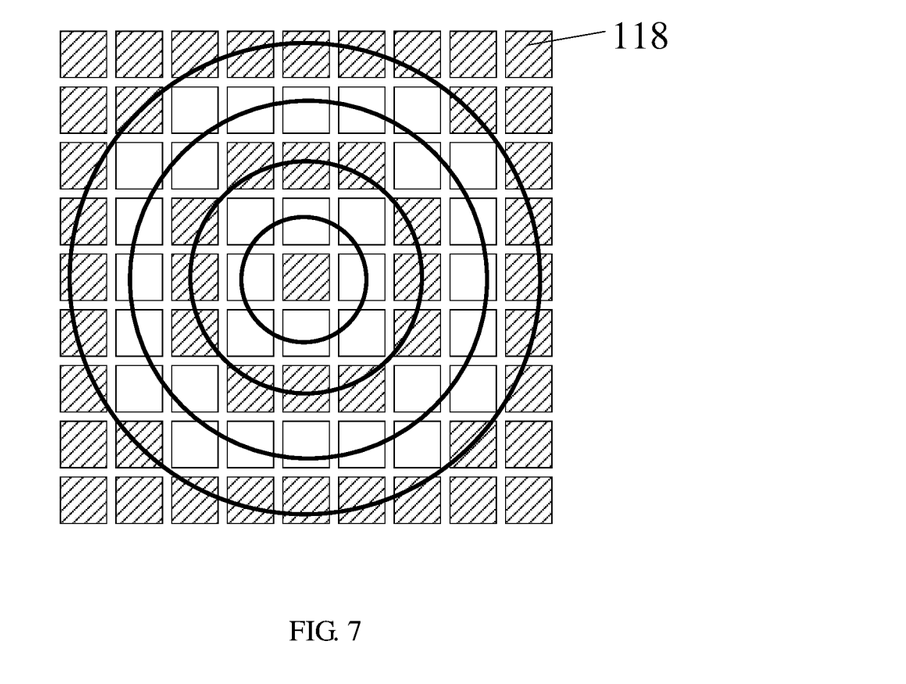
FIG. 7 is a structural schematic diagram of a pixel electrode at respective positions of the liquid crystal lens provided in the present application.

In some embodiments, as shown in FIG. 7, the pixel electrode 118 comprises a plurality of sets of sub-pixel electrodes, and orthographic projection areas of the plurality of sets of sub-pixel electrodes on the second substrate 112 are overlapped with the orthographic projection area of the third substrate 121 on the second substrate 112; each set of sub-pixel electrodes are located on a circle which takes a center of the liquid crystal lens as a center of the circle, and each circle has a different radius.

Figure 2:
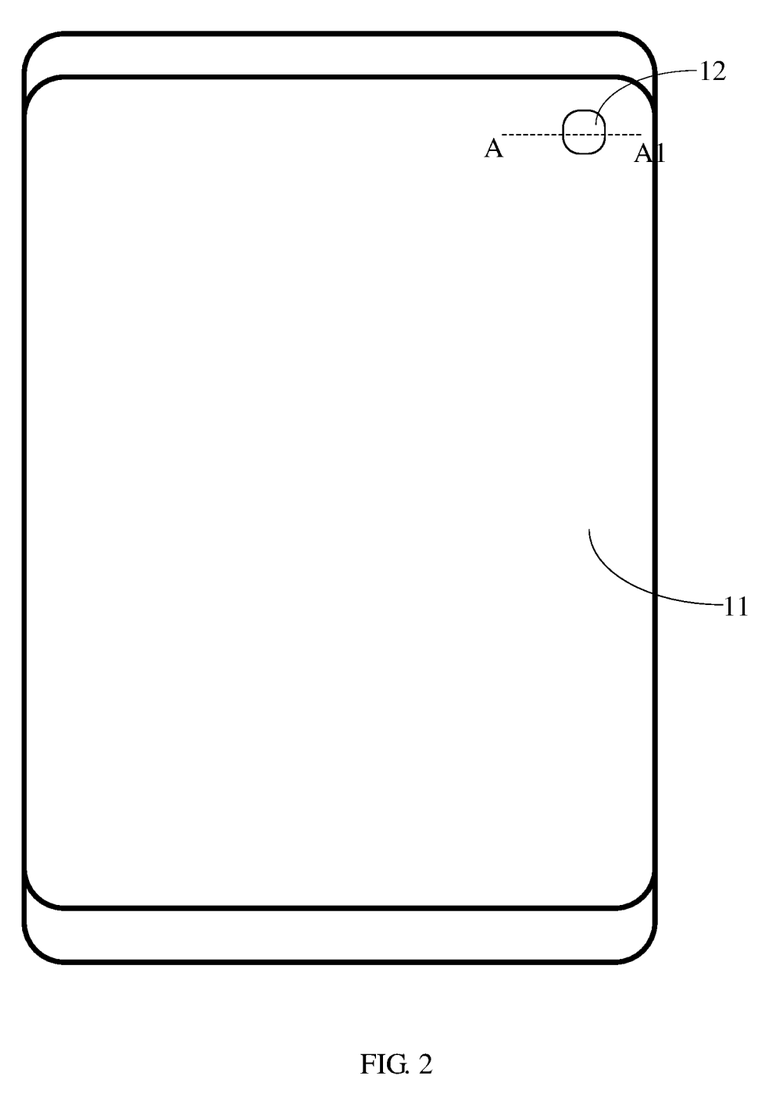
FIG. 2 is a planar structural schematic diagram of a display module provided in the present application.

Based on the same inventive concept, the embodiments of the present application further provide a display module, and as shown in FIG. 2, the display module includes an imaging module (not shown in the figure) and the display panel provided in the embodiments of the present application.

As shown in FIG. 3 to FIG. 6, the imaging module 13 is disposed on one side of the liquid crystal display panel 11 away from the light emitting surface, and an orthographic projection area of the imaging module 13 on the first substrate 111 is overlapped with the orthographic projection area of the third substrate 121 on the first substrate 111.

The display module provided in the embodiments of the present application is described in detail below with reference to the accompanying drawings.

As shown in FIG. 3 to FIG. 6, the display module provided in an embodiment of the present application further comprises a backlight source 14 located on one side of the liquid crystal display panel 11 away from the light emitting surface; the backlight source 14 being disconnected at a position corresponding to the imaging module 13. In particular, the backlight source 14 includes several white micro light emitting diodes (Micro LEDs) arranged in an array.

In some embodiments, as shown in FIG. 3, the liquid crystal display panel 11 further comprises: a first polarizer 114 located on one side of the second substrate 112 away from the first substrate 111, a second polarizer 115 located on one side of the first substrate 111 away from the second substrate 112, a color film layer 116 located on one side of the first substrate 111 close to the first liquid crystal layer 113, a common electrode 117 located on one side of the second substrate 112 close to the first liquid crystal layer 113, and a pixel electrode 118 located on one side of the color film layer 116 close to the first liquid crystal layer 113; the liquid crystal lens 12 is located on a light emitting surface side of the liquid crystal display panel 11, and the liquid crystal lens 12 further comprises a lens electrode 123 located on one side of the third substrate 121 close to the second liquid crystal layer 122.

As shown in FIG. 3, the first polarizer 114 is disposed close to the backlight source 14, and the second polarizer 115 is disposed away from the backlight source 14; the position of the first polarizer 114 corresponds to the position of the first liquid crystal layer 113; the position of the second polarizer 115 corresponds to the position of the backlight source 14; the position of the color film layer 116 corresponds to the position of the backlight source 14; the positions of the common electrode 117 and the pixel electrode 118 correspond to the position of the first liquid crystal layer 113.

As shown in FIG. 3, the liquid crystal lens in the embodiment of the present application is disposed in the display screen, and the structure of the liquid crystal display panel is similar to that in the related art, except that the color film layer 116 and the second polarizer 115 are not provided at the position where the liquid crystal lens exits, which is because only one polarizer is needed to filter out O-light and absorption of the color film layer to imaging light is to be avoided during the imaging of the lens, and the liquid crystal lens comprises the second liquid crystal layer 122 and the first liquid crystal layer 113 at the position corresponding to the second liquid crystal layer 122. When light is subjected to birefringence phenomenon during propagation in the uniaxial crystal, one of two refracted light beams constantly obeys the common refraction law, and this light beam is called ordinary light and is called O-light for short.

In some other embodiments, as shown in FIG. 4, the liquid crystal display panel 11 further comprises: a first polarizer 114 located on one side of the second substrate 112 away from the first substrate 111, a second polarizer 115 located on one side of the first substrate 111 away from the second substrate 112, a color film layer 116 located on one side of the second substrate 112 close to the first liquid crystal layer 113, a common electrode 117 located on one side of the color film layer 116 close to the first liquid crystal layer 113, and a pixel electrode 118 located on one side of the first substrate 111 close to the first liquid crystal layer 113; the liquid crystal lens 12 is located on one side of the liquid crystal display panel 11 away from the light emitting surface, and the liquid crystal lens 12 further includes a lens electrode 123 located on one side of the third substrate 121 close to the second liquid crystal layer 122.

As shown in FIG. 4, the second polarizer 115 is located disposed to the backlight source 14, and the first polarizer 114 is disposed away from the backlight source 14; the position of the first polarizer 114 corresponds to the position of the first liquid crystal layer 113; the position of the second polarizer 115 corresponds to the position of the backlight source 14; the position of the color film layer 116 corresponds to the position of the backlight source 14; the positions of the common electrode 117 and the pixel electrode 118 correspond to the position of the first liquid crystal layer 113.

In the embodiment shown in FIG. 4, the liquid crystal lens and the imaging module are both located on one side of the liquid crystal display panel away from the light emitting surface, so as to make sure that the display side is a complete plane, which can make the device more reliable and facilitate the assembly.

In order to further improve the display effect in the display mode, in some further embodiments, as shown in FIG. 5, the liquid crystal display panel 11 further comprises: a quantum rod color film 119 located on one side of the second substrate 112 away from the first substrate 111, a first polarizer 114 located on one side of the first substrate 111 away from the second substrate 112, a common electrode 117 located on one side of the second substrate 112 close to the first liquid crystal layer 113, and a pixel electrode 118 located on one side of the first substrate 111 close to the first liquid crystal layer 113; the liquid crystal lens 12 is located on a light emitting surface side of the liquid crystal display panel 11, and the liquid crystal lens 12 further includes: a lens electrode 123 located on one side of the third substrate 121 close to the second liquid crystal layer 122, and a second polarizer 115 located on one side of the third substrate 121 away from the second liquid crystal layer 122.

As shown in FIG. 5, the position of the quantum rod color film 119 corresponds to the position of the first liquid crystal layer 113; the position of the first polarizer 114 corresponds to the position of the backlight source 14; the positions of the common electrode 117 and the pixel electrode 118 correspond to the position of the first liquid crystal layer 113.

The embodiment shown in FIG. 5 is similar to the embodiment shown in FIG. 3, except for the arrangement of the polarizer and the color film layer: in the embodiment shown in FIG. 5, the polarizer is arranged on the whole display screen, that is, in addition to the first polarizer 114 located on one side of the first substrate 111 away from the second substrate 112, the second polarizer 115 is also located on one side of the third substrate 121 away from the second liquid crystal layer 122, and the quantum rod color film 119 is located on one side of the second substrate 112 away from the first substrate 111, and the position of the quantum rod color film 119 corresponds to the position of the first liquid crystal layer 113; the embodiment shown in FIG. 5 can perform pattern display at the liquid crystal lens.

As shown in FIG. 5, the quantum rod color film 119 can emit color polarized light after being excited, so the quantum rod color film 119 can replace the color film layer and the polarizer, and the quantum rod color film 119 at the position corresponding to the liquid crystal lens can be driven as a polarized color film in the display mode to realize a display function, and no voltage is applied thereto in the imaging mode so that imaging light can normally pass through, thereby realizing lens imaging.

Figure 6:
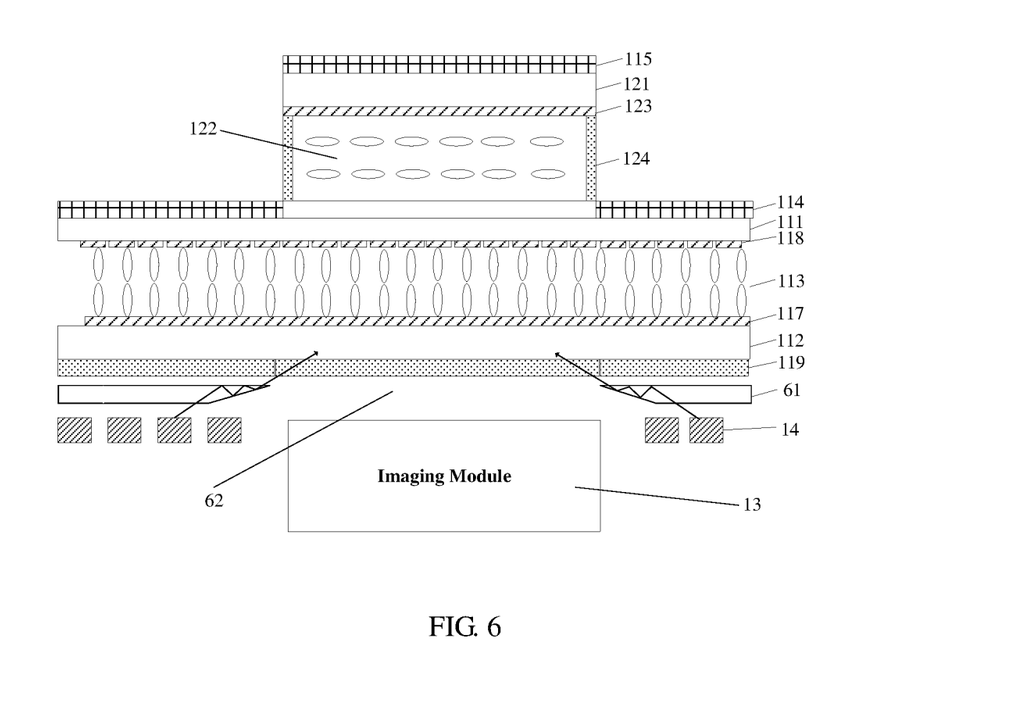
FIG. 6 is a cross-sectional structural schematic diagram of a further display module of FIG. 2 taken along direction AA1.

In order to reduce the influence of no backlight at the position of the liquid crystal lens on the display effect, in some embodiments, as shown in FIG. 6, the display screen provided in the embodiment of the present application further comprises a light homogenizing plate 61 located between the backlight source 14 and the liquid crystal display panel 11 and provided with an opening 62 at the position corresponding to the imaging module 13; the light homogenizing plate 61 is arranged to guide the light around the imaging module 13 to the position corresponding to the liquid crystal lens, so as to improve the display brightness at the position corresponding to the liquid crystal lens in the display mode.

In some embodiments, as shown in FIG. 6, an edge of the opening 62 is wedge-shaped, and the arrangement of the wedge-shaped structure can further guide the light around the imaging module 13 to the position corresponding to the liquid crystal lens, so as to further improve the display brightness at the position corresponding to the liquid crystal lens in the display mode.

In some embodiments, as shown in FIG. 3 to FIG. 6, the pattern of the lens electrode 123 is the same as the pattern of the pixel electrode 118, and in the display mode, the same voltage is applied to the pixel electrode 118 and lens electrode 123 which correspond to each other to avoid the influence of the pixel voltage on the second liquid crystal layer 122, and ensure that it maintains a good transparent state.

In some embodiments, as shown in FIG. 7, the pixel electrode 118 at the position corresponding to the position of the second liquid crystal layer 122 includes a plurality of sets of sub-pixel electrodes, each set of sub-pixel electrodes are located on a circle that takes the center of the liquid crystal lens as the center of the circle, and each circle has a different radius; in this way, it is possible to apply different voltages to each set of sub-pixel electrodes during imaging so that the first liquid crystal layer 113 and the second liquid crystal layer 122 achieve a desired phase curve. In driving, row scanning techniques used for display in the liquid crystal display panel may still be used, except that in the camera mode, the pixel electrode for driving the liquid crystal lens is applied with a fixed voltage each time it is scanned.

Figure 8:
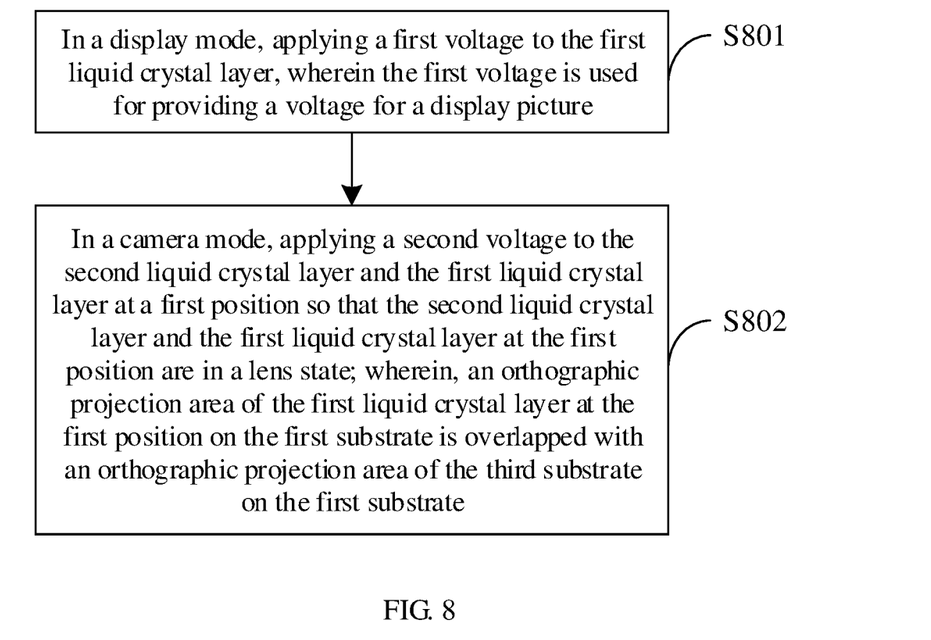
FIG. 8 is a flowchart of a method for driving a display panel provided in the present application.

Based on the same inventive concept, embodiments of the present application further provide a method for driving the display panel, as shown in FIG. 8, comprising:

S801, in a display mode, applying a first voltage to the first liquid crystal layer, wherein the first voltage is used for providing a voltage for a display picture;

S802, in a camera mode, applying a second voltage to the second liquid crystal layer and the first liquid crystal layer at a first position to enable the second liquid crystal layer and the first liquid crystal layer at the first position to be in a lens state; wherein, an orthographic projection area of the first liquid crystal layer at the first position on the first substrate is overlapped with an orthographic projection area of the third substrate on the first substrate.

In some embodiments, the driving method further comprises: in the display mode, applying the same first voltage to the lens electrode and the pixel electrode; in the camera mode, applying a third voltage to the pixel electrode at a second position, applying the first voltage to the pixel electrodes at the other positions, applying a fourth voltage to the lens electrode, the third voltage and the fourth voltage being used for adjusting a focal length of the liquid crystal lens; wherein, an orthographic projection area of the pixel electrode at the second position on the first substrate is overlapped with an orthographic projection area of the third substrate on the first substrate.

The driving method in the display mode and the camera mode will be described below with reference to the drawings.

Figure 9:
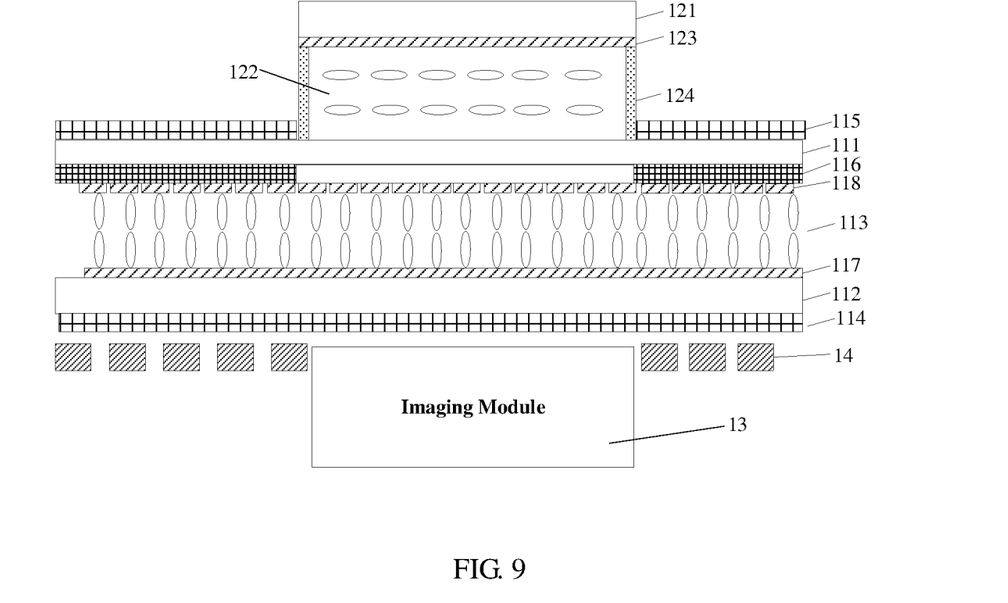
FIG. 9 is a cross-sectional structural schematic diagram of a display module provided in the present application in a display mode.

As shown in FIG. 9, in the display mode, the voltage for the display picture is applied to all the pixel electrodes 118. Since the thickness of the second liquid crystal layer 122 is larger than that of the first liquid crystal layer 113, the second liquid crystal layer 122 is less affected by the voltage of the pixel electrode at this time, and thus can substantially maintain a transparent state. Specifically, the lens electrode 123 may be provided with the same pattern as the pixel electrode 118, and the same voltage may be applied to the pixel electrode 118 and lens electrode 123 which correspond to each other in the display mode, so as to avoid the influence of the pixel voltage on the second liquid crystal layer 122 and ensure that it maintains a good transparent state.

As shown in FIG. 9, since the second liquid crystal layer 122 cannot normally image, a convex lens may be disposed around the first liquid crystal layer 113 to enlarge the periphery pixels of the first liquid crystal layer 113 that can normally display, thereby reducing adverse effects caused by the abnormal display of a part of the first liquid crystal layer 113 as much as possible.

Figure 10:
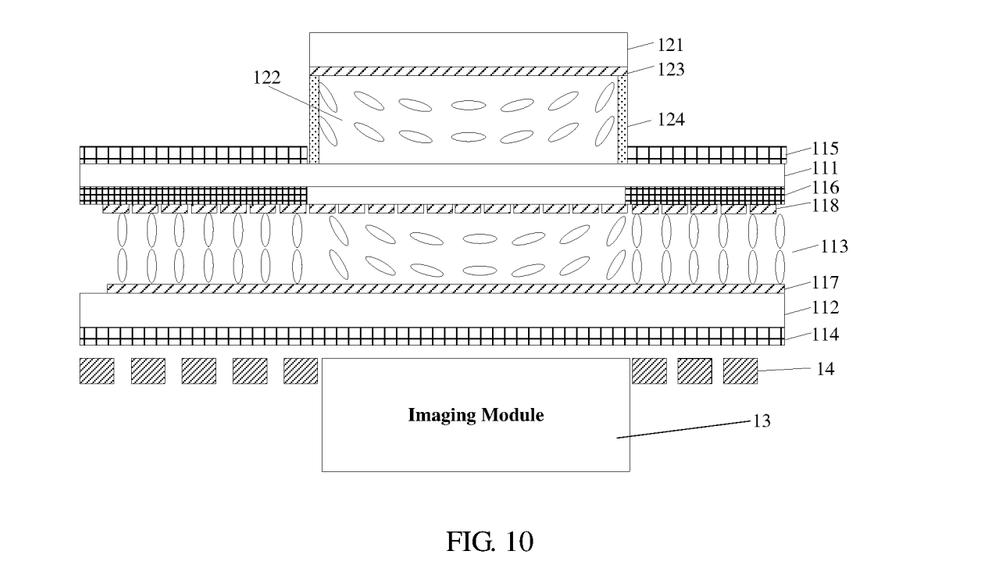
FIG. 10 is a cross-sectional structural schematic diagram of a display module provided in the present application in a camera mode.

As shown in FIG. 10, in the camera mode, a third voltage is applied to the pixel electrode 118 at a position corresponding to the second liquid crystal layer 122, a voltage for the display picture is applied to the pixel electrodes 118 at the remaining positions, and a fourth voltage is applied to the lens electrode 123. At this time, the second liquid crystal layer 122 and the first liquid crystal layer 113 at the position corresponding to the second liquid crystal layer 122 are in a lens state, and the focal length thereof is related to the magnitudes of the third voltage, the fourth voltage, and the common voltage, so the focusing function can be realized by adjusting the third voltage and the fourth voltage.

The pixel electrode in the embodiment of the present application can serve as a driving electrode of the liquid crystal lens, and the driving process of the liquid crystal lens is merged into the display process of the liquid crystal display panel, thus, the need of an extra driving circuit for the liquid crystal lens is eliminated, which simplifies the driving circuit of the liquid crystal lens, makes the device structure simpler and more compact, can reduce the thickness of the full-screen imaging portion, and can realize quick zooming. In some embodiments, the Micro LEDs near the imaging module 13 may be turned off to avoid the influence of the backlight on the imaging light and ensure a good imaging effect. According to the embodiment of the present application, the position of the liquid crystal lens can be switched between imaging and displaying, and there are no display blind spots on the full screen.

To sum up, the display panel and display module provided in the present application have following beneficial effects:

First, in the embodiments of the present application, a liquid crystal lens is provided in the display region and comprises a third substrate located to face the first substrate and a second liquid crystal layer located between the first substrate and the third substrate, wherein the liquid crystal lens can serve as an imaging lens of the imaging module during imaging, that is, the liquid crystal lens provided in the embodiments of the present application can replace the imaging lens in the front camera in the related part, and thus can simplify the camera module structure; moreover, in the embodiments of the present application, in addition to that the second liquid crystal layer serves as a part of the liquid crystal lens, the first liquid crystal layer at the position corresponding to the second liquid crystal layer can also serve as a part of the liquid crystal lens, thereby reducing the overall thickness.

Second, in the embodiments of the present application, the thickness of the second liquid crystal layer is greater than that of the first liquid crystal layer, for example, the thickness of the second liquid crystal layer is several times to several tens of times greater than that of the first liquid crystal layer; in this way, the second liquid crystal layer can substantially maintain a transparent state during display on the display screen.

Third, the display module provided by the embodiments of the present application further comprises a light homogenizing plate located between the backlight source and the liquid crystal display panel and provided with an opening at the position corresponding to the imaging module; the arrangement of the light homogenizing plate can further guide the light around the imaging module to the position corresponding to the liquid crystal lens, so as to improve the display brightness at the position corresponding to the liquid crystal lens in the display mode.

Fourth, the pattern of the lens electrode is the same as that of the pixel electrode, and in the display mode, the same voltage is applied to the pixel electrode and lens electrode which correspond to each other, so as to avoid the influence of the pixel voltage on the second liquid crystal layer, and make sure that it maintains a good transparent state.

Fifth, the liquid crystal display panel provided in the embodiments of the present application further comprises an optical element disposed around the first liquid crystal layer, where the optical element is arranged to enlarge the periphery pixels around the first liquid crystal layer that can normally display, so as to reduce adverse effects caused by the abnormal display of a part of the first liquid crystal layer as much as possible.

The foregoing only describes a few embodiments of the present application and it should be noted that those skilled in the art can make various improvements and modifications without departing from the principle of the present application, and that these improvements and modifications should also be considered as the scope of protection of the present application.

What is claimed is:

1. A display panel, comprising: a liquid crystal display panel and a liquid crystal lens;
wherein the liquid crystal display panel comprises: a first substrate and a second substrate disposed to face each other, and a first liquid crystal layer located between the first substrate and the second substrate;
wherein the liquid crystal lens comprises: a third substrate disposed on one side of the first substrate away from the second substrate, and a second liquid crystal layer located between the first substrate and the third substrate; and
wherein the third substrate is located within a display region of the display panel;
the third substrate is located corresponding to an imaging module located on one side of the liquid crystal display panel away from a light-emitting surface, and an orthographic projection area of the imaging module on the first substrate is overlapped with an orthographic projection area of the third substrate on the first substrate; and
an area of the first substrate is lager than an area of the third substrate.

2. The display panel according to claim 1, wherein a thickness of the second liquid crystal layer is greater than a thickness of the first liquid crystal layer.

3. The display panel according to claim 1, wherein the liquid crystal display panel further comprises: a first polarizer located on one side of the second substrate away from the first substrate, a second polarizer located on one side of the first substrate away from the second substrate, a color film layer located on one side of the first substrate close to the first liquid crystal layer, a common electrode located on one side of the second substrate close to the first liquid crystal layer, and a pixel electrode located on one side of the color film layer close to the first liquid crystal layer;
an orthographic projection area of the first polarizer on the second substrate is overlapped with an area of the second substrate;
an orthographic projection area of the second polarizer on the first substrate is a first area, an orthographic projection area of the third substrate on the first substrate is a second area, the first area and the second area are not overlapped, and an area formed by the first area and the second area is overlapped with an area of the first substrate;
an orthographic projection area of the color film layer on the first substrate is overlapped with the orthographic projection area of the second polarizer on the first substrate;
each of an orthogonal projection area of the common electrode on the second substrate and an orthogonal projection area of the pixel electrode on the second substrate is overlapped with the area of the second substrate; and
the liquid crystal lens is located on a light-emitting surface side of the liquid crystal display panel, and the liquid crystal lens further comprises a lens electrode located on one side of the third substrate close to the second liquid crystal layer.

4. The display panel according to claim 1, wherein the liquid crystal display panel further comprises: a first polarizer located on one side of the second substrate away from the first substrate, a second polarizer located on one side of the first substrate away from the second substrate, a color film layer located on one side of the second substrate close to the first liquid crystal layer, a common electrode located on one side of the color film layer close to the first liquid crystal layer, and a pixel electrode located on one side of the first substrate close to the first liquid crystal layer;
an orthographic projection area of the first polarizer on the second substrate is overlapped with an area of the second substrate;
an orthographic projection area of the second polarizer on the first substrate is a first area, an orthographic projection area of the third substrate on the first substrate is a second area, the first area and the second area are not overlapped, and an area formed by the first area and the second area is overlapped with an area of the first substrate;
an orthographic projection area of the color film layer on the first substrate is overlapped with the orthographic projection area of the second polarizer on the first substrate;
each of an orthogonal projection area of the common electrode on the second substrate and an orthogonal projection area of the pixel electrode on the second substrate is overlapped with the area of the second substrate; and
the liquid crystal lens is located on one side of the liquid crystal display panel away from a light-emitting surface, and the liquid crystal lens further comprises a lens electrode located on one side of the third substrate close to the second liquid crystal layer.

5. The display panel according to claim 1, wherein the liquid crystal display panel further comprises: a quantum rod color film located on one side of the second substrate away from the first substrate, a first polarizer located on one side of the first substrate away from the second substrate, a common electrode located on one side of the second substrate close to the first liquid crystal layer, and a pixel electrode located on one side of the first substrate close to the first liquid crystal layer;
an orthographic projection area of the quantum rod color film on the second substrate is overlapped with an area of the second substrate;
an orthographic projection area of the first polarizer on the first substrate is a first area, an orthographic projection area of the third substrate on the first substrate is a second area, the first area and the second area are not overlapped, and an area formed by the first area and the second area is overlapped with an area of the first substrate;
each of an orthogonal projection area of the common electrode on the second substrate and an orthogonal projection area of the pixel electrode on the second substrate is overlapped with the area of the second substrate;
the liquid crystal lens is located on a light-emitting surface side of the liquid crystal display panel, and the liquid crystal lens further comprises: a lens electrode located on one side of the third substrate close to the second liquid crystal layer, and a second polarizer located on one side of the third substrate away from the second liquid crystal layer; and an orthographic projection area of the second polarizer on the third substrate is overlapped with an area of the third substrate.

6. The display panel according to claim 3, wherein a pattern of the lens electrode is the same as a pattern of the pixel electrode.

7. The display panel according to claim 6, wherein the pixel electrode comprises a plurality of sets of sub-pixel electrodes, and orthographic projection areas of the plurality of sets of sub-pixel electrodes on the second substrate are overlapped with an orthographic projection area of the third substrate on the second substrate; and each set of sub-pixel electrodes are located on a circle which takes a center of the liquid crystal lens as a center of the circle, and each circle has a different radius.

8. The display panel according to claim 1, wherein the liquid crystal display panel further comprises an optical element disposed around the first liquid crystal layer; and the liquid crystal lens further comprises a sealing glue, located between the first substrate and the third substrate, for sealing the second liquid crystal layer.

9. A display module, comprising: an imaging module, and the display panel according to claim 1;

wherein the imaging module is located on one side of the liquid crystal display panel away from a light-emitting surface, and an orthographic projection area of the imaging module on the first substrate is overlapped with an orthographic projection area of the third substrate on the first substrate.

10. The display module according to claim 9, further comprising a backlight source located on said one side of the liquid crystal display panel away from the light-emitting surface;

wherein, no backlight source is located at a position of the imaging module.

11. The display module according to claim 10, wherein the backlight source comprises a number of white micro-LEDs arranged in an array.

12. The display module according to claim 10, further comprising a light homogenizing plate located between the backlight source and the liquid crystal display panel and provided with an opening at the position of the imaging module.

13. The display module according to claim 12, wherein an edge of the opening is wedge-shaped.

14. A method of driving the display panel according to claim 1, comprising:

in a display mode, applying a first voltage to the first liquid crystal layer, wherein the first voltage is used for providing a voltage for a display picture;

in a camera mode, applying a second voltage to the second liquid crystal layer and the first liquid crystal layer at a first position so that the second liquid crystal layer and the first liquid crystal layer at the first position are in a lens state; wherein, an orthographic projection area of the first liquid crystal layer at the first position on the first substrate is overlapped with an orthographic projection area of the third substrate on the first substrate.

15. A method of driving the display panel according to claim 3, comprising:

in a display mode, applying a same first voltage to the lens electrode and the pixel electrode, wherein the first voltage is used for providing a voltage for a display picture;

in a camera mode, applying a third voltage to the pixel electrode at a second position, applying the first voltage to the pixel electrode at other positions, applying a fourth voltage to the lens electrode, wherein the third voltage and the fourth voltage are used for adjusting a focal length of the liquid crystal lens;

wherein, an orthographic projection area of the pixel electrode at the second position on the first substrate is overlapped with an orthographic projection area of the third substrate on the first substrate.

16. The display panel according to claim 4, wherein a pattern of the lens electrode is the same as a pattern of the pixel electrode.

17. The display panel according to claim 16, wherein the pixel electrode comprises a plurality of sets of sub-pixel electrodes, and orthographic projection areas of the plurality of sets of sub-pixel electrodes on the second substrate are overlapped with an orthographic projection area of the third substrate on the second substrate; and each set of sub-pixel electrodes are located on a circle which takes a center of the liquid crystal lens as a center of the circle, and each circle has a different radius.

18. The display panel according to claim 5, wherein a pattern of the lens electrode is the same as a pattern of the pixel electrode.

19. The display panel according to claim 18, wherein the pixel electrode comprises a plurality of sets of sub-pixel electrodes, and orthographic projection areas of the plurality of sets of sub-pixel electrodes on the second substrate are overlapped with an orthographic projection area of the third substrate on the second substrate; and each set of sub-pixel electrodes are located on a circle which takes a center of the liquid crystal lens as a center of the circle, and each circle has a different radius.

20. A display module, comprising: an imaging module, and the display panel according to claim 3;

wherein the imaging module is located on one side of the liquid crystal display panel away from a light-emitting surface, and an orthographic projection area of the imaging module on the first substrate is overlapped with an orthographic projection area of the third substrate on the first substrate.

* * * * *

UNITED STATES PATENT AND TRADEMARK OFFICE
CERTIFICATE OF CORRECTION

| | |
|---|---|
| PATENT NO. | : 11,644,713 B2 |
| APPLICATION NO. | : 16/769817 |
| DATED | : May 9, 2023 |
| INVENTOR(S) | : Lijia Zhou et al. |

It is certified that error appears in the above-identified patent and that said Letters Patent is hereby corrected as shown below:

In the Claims

Column 13, Line 32, Claim 1, delete "lager" and insert -- larger --

Signed and Sealed this
Twenty-seventh Day of June, 2023

Katherine Kelly Vidal
*Director of the United States Patent and Trademark Office*